(12) United States Patent
Pedersen

(10) Patent No.: US 12,443,310 B2
(45) Date of Patent: Oct. 14, 2025

(54) TOUCH-SENSITIVE APPARATUS WITH IMPROVED NOISE IMMUNITY AND METHOD

(71) Applicant: TouchNetix AS, Trondheim (NO)

(72) Inventor: Trond Jarle Pedersen, Trondheim (NO)

(73) Assignee: TouchNetix AS, Trondheim (NO)

( * ) Notice: Subject to any disclaimer, the term of this patent is extended or adjusted under 35 U.S.C. 154(b) by 0 days.

(21) Appl. No.: 18/718,189

(22) PCT Filed: Dec. 20, 2022

(86) PCT No.: PCT/EP2022/086921
§ 371 (c)(1),
(2) Date: Jun. 10, 2024

(87) PCT Pub. No.: WO2023/118091
PCT Pub. Date: Jun. 29, 2023

(65) Prior Publication Data
US 2025/0053261 A1 Feb. 13, 2025

(30) Foreign Application Priority Data
Dec. 21, 2021 (GB) ...................................... 2118649

(51) Int. Cl.
*G06F 3/041* (2006.01)
*G01D 5/24* (2006.01)
*G06F 3/044* (2006.01)

(52) U.S. Cl.
CPC ............. *G06F 3/0418* (2013.01); *G01D 5/24* (2013.01); *G06F 3/04166* (2019.05); *G06F 3/0446* (2019.05)

(58) Field of Classification Search
CPC .. G06F 3/0418; G06F 3/04166; G06F 3/0446; G06F 3/04182; G06F 3/041; G06F 3/044; G01D 5/24
See application file for complete search history.

(56) References Cited

U.S. PATENT DOCUMENTS 10,558,302 B2    2/2020  Shahparnia
10,732,746 B2 *  8/2020  Kim ...................... G06F 3/0446
(Continued)

OTHER PUBLICATIONS

Combined Search and Examination Report issued by the United Kingdom Intellectual Property Office for priority GB application No. 2118649.9, mailed Jul. 18, 2022.
(Continued)

*Primary Examiner* — Amy Onyekaba
(74) *Attorney, Agent, or Firm* — Renner, Otto, Boisselle & Sklar, LLP.

(57) ABSTRACT

Described is a touch-sensitive apparatus for sensing the presence of an object relative to a touch-sensitive surface using capacitance measurements. The apparatus includes an electrode array comprising at least one electrode, the electrode array providing the touch-sensitive surface; a signal generating module for generating a time-varying drive signal to be applied to the electrode array; a differential amplifier comprising: a first input configured to receive a time-varying sensor signal from an electrode of the electrode array, the sensor signal indicative of a capacitive coupling associated with the at least one electrode; a second input configured to receive a time-varying reference signal; a first output configured to output a first output signal from the differential amplifier based on a difference between the time-varying sensor signal and the time-varying reference signal; and control circuitry configured to determine the presence of an object, wherein the apparatus further comprises a subtractor for subtracting a signal from the first (Continued)

output signal from the differential amplifier to generate a subtracted signal, wherein the control circuitry is configured to receive a signal based on the subtracted signal and to determine the presence of an object based on the received signal. Further disclosed is a method for sensing the presence of an object relative to a touch-sensitive surface using capacitance measurements of a touch sensitive apparatus.

13 Claims, 9 Drawing Sheets

(56) References Cited

U.S. PATENT DOCUMENTS

| | | | | |
|---|---|---|---|---|
| 11,537,236 B1* | 12/2022 | Huang | | G06F 3/04182 |
| 2008/0198058 A1* | 8/2008 | Watson | | H03M 1/08 |
| | | | | 341/161 |
| 2010/0060610 A1* | 3/2010 | Wu | | G06F 3/04182 |
| | | | | 345/174 |
| 2010/0149110 A1* | 6/2010 | Gray | | G06F 3/0445 |
| | | | | 345/173 |
| 2010/0164631 A1* | 7/2010 | Schneider | | H03F 3/005 |
| | | | | 330/297 |
| 2012/0050180 A1* | 3/2012 | King | | G06F 3/041662 |
| | | | | 345/173 |
| 2014/0021966 A1* | 1/2014 | Shahrokhi | | G01R 27/2605 |
| | | | | 324/679 |
| 2014/0253508 A1* | 9/2014 | Yumoto | | G06F 3/04166 |
| | | | | 345/174 |
| 2015/0338952 A1* | 11/2015 | Shahparnia | | G06F 3/0443 |
| | | | | 345/174 |
| 2017/0212635 A1* | 7/2017 | Cordeiro | | G06F 3/04182 |
| 2019/0107919 A1* | 4/2019 | Chen | | G06F 3/0418 |
| 2020/0103993 A1* | 4/2020 | Krah | | G06F 3/04182 |
| 2021/0286462 A1* | 9/2021 | Wu | | H03K 17/962 |
| 2022/0011891 A1* | 1/2022 | Yu | | G06F 3/04164 |

OTHER PUBLICATIONS

International Search Report and Written Opinion issued for priority international application No. PCT/EP2022/086921, mailed Mar. 17, 2023.

* cited by examiner

TOUCH-SENSITIVE APPARATUS WITH IMPROVED NOISE IMMUNITY AND METHOD

This application is a national phase of International Application No. PCT/EP2022/086921, filed Dec. 20, 2022, which claims priority to United Kingdom Application No. 2118649.9, filed Dec. 21, 2021, each of which is hereby incorporated herein by reference in its entirety.

BACKGROUND OF THE INVENTION

The present invention relates to the field of touch sensors, for example touch sensors for overlying a display screen to provide a touch-sensitive display (touch screen). In particular, embodiments of the invention relate to techniques for measuring the capacitance using drive electrodes and receive electrodes for sensing the presence of one or more touching objects within a two-dimensional sensing area.

A capacitive touch sensor can be generalised as one that uses a physical sensor element comprising an arrangement of electrically conductive electrodes extending over a touch sensitive area (sensing area) to define sensor nodes (or intersection points) and controller circuitry connected to the electrodes and operable to measure changes in the electrical capacitance of each of the electrodes or the mutual-capacitance between combinations of the electrodes. The electrodes are typically provided on a substrate.

For such capacitive touch sensors, circuitry is arranged to apply an analogue signal (i.e. a time-varying voltage) to the electrodes in order to perform a measurement of the capacitance. Such a signal typically results in an analogue signal (such as a time varying voltage/current) that is received or obtained from the electrodes, with this analogue signal including information regarding the measured capacitance for a given electrode or at a given intersection point. Techniques have been developed for analysing the analogue signal and for determining whether a touch (or an object) is present.

However, sources of external noise, such as power supplies or other electronic components, and sources of internal noise, such as the same components but provided internally to the touch-sensitive apparatus, can capacitively couple to the electrode array and/or the signalling coupling components to the electrode array. Accordingly, it becomes difficult to accurately and reliably determine changes in the capacitance signals resulting from genuine touches/objects on the touch sensitive surface versus changes in the capacitance signals arising due to noise.

While various approaches have been considered previously, such as increasing the amplitude of the signal applied to the electrode array, such solutions tend to increase costs and require a larger circuit board footprint, and are thus not ideal in all applications.

Various approaches are described which seek to help address some of these issues.

SUMMARY OF THE INVENTION

According to a first aspect of the invention there is provided a touch-sensitive apparatus for sensing the presence of an object relative to a touch-sensitive surface using capacitance measurements, the apparatus including: an electrode array comprising at least one electrode, the electrode array providing the touch-sensitive surface; a signal generating module for generating a time-varying drive signal to be applied to the electrode array; a differential amplifier comprising: a first input configured to receive a time-varying sensor signal from an electrode of the electrode array, the sensor signal indicative of a capacitive coupling associated with the at least one electrode; a second input configured to receive a time-varying reference signal; a first output configured to output a first output signal from the differential amplifier based on a difference between the time-varying sensor signal and the time-varying reference signal; and control circuitry configured to determine the presence of an object, wherein the apparatus further comprises a subtractor for subtracting a signal from the first output signal from the differential amplifier to generate a subtracted signal, wherein the control circuitry is configured to receive a signal based on the subtracted signal and to determine the presence of an object based on the received signal.

According to a second aspect of the invention there is provided a method for sensing the presence of an object relative to a touch-sensitive surface using capacitance measurements of a touch sensitive apparatus comprising an electrode array comprising at least one electrode, the electrode array providing the touch-sensitive surface, the method including: applying a time-varying drive signal to the electrode array; receiving a time-varying sensor signal from an electrode of the electrode array, the sensor signal indicative of a capacitive coupling associated with the at least one electrode; applying the time-varying sensor signal to a first input of a differential amplifier, and applying a time-varying reference signal to a second input of the differential amplifier; outputting a first output signal based on the difference between the time-varying sensor signal received from the electrode at the first input and the time-varying reference signal received at the second input; subtracting a signal from the first output signal from the differential amplifier to generate a subtracted signal; and determining the presence of an object using a signal based on the subtracted signal.

It will be appreciated that features and aspects of the invention described above in relation to the first and other aspects of the invention are equally applicable to, and may be combined with, embodiments of the invention according to other aspects of the invention as appropriate, and not just in the specific combinations described above.

BRIEF DESCRIPTION OF THE DRAWINGS

The invention is now described by way of example only with reference to the following drawings in which.

DETAILED DESCRIPTION

The present disclosure relates broadly to measurement circuitry for use in touch sensitive apparatuses (which comprises an array of electrodes forming a touch sensitive surface) for determining the presence or absence of a touch.

More particularly, the present disclosure relates to the use of a differential amplifier for improving the noise immunity of the measurement circuitry to external noise that potentially affects/couples to the capacitive signals received from the electrode array, and also to improving the resolution achievable for processing such received signals.

Figure 1:
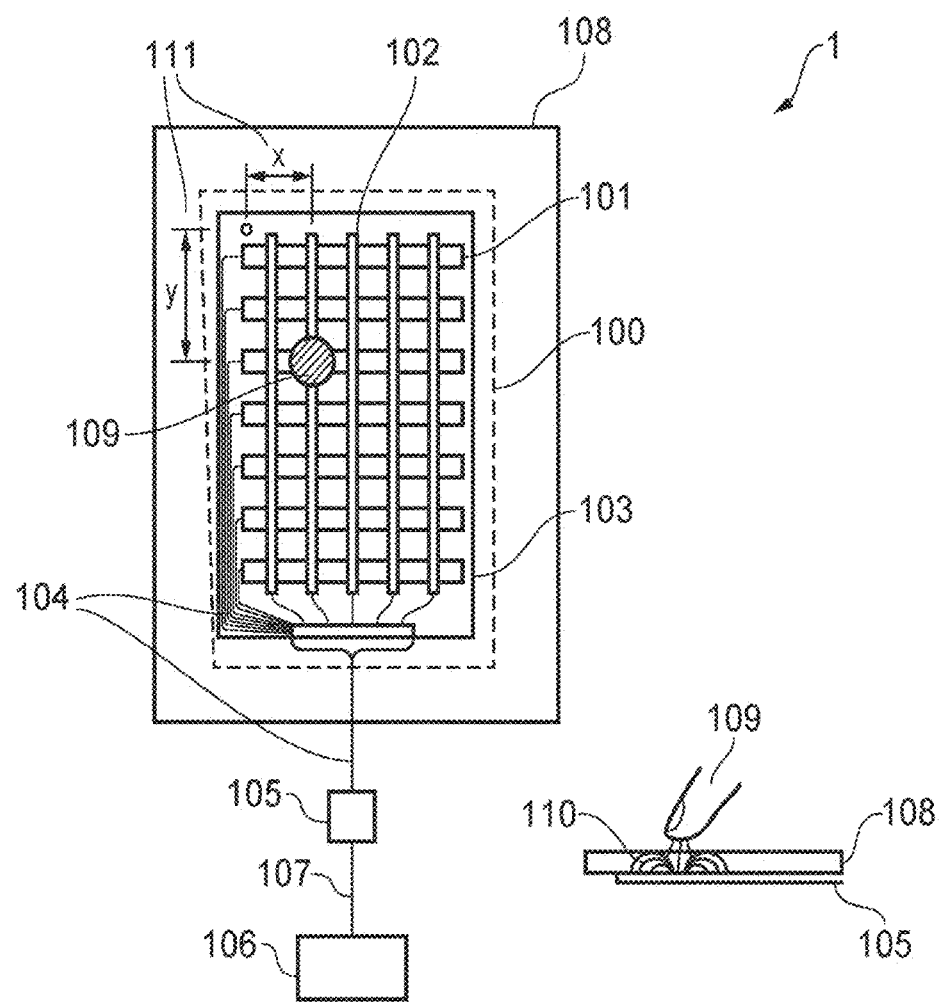
FIG. 1 schematically illustrates a touch sensitive apparatus incorporating measurement circuitry in accordance with certain embodiments of the invention.

FIG. 1 schematically shows an example touch-sensitive apparatus 1. The touch-sensitive apparatus 1 is represented in plan view (to the left in the figure) and also in cross-sectional view (to the right in the figure).

The touch-sensitive apparatus 1 comprises a sensor element 100, measurement circuitry 105, control circuitry 106, and cover 108. The sensor element 100 and cover 108 may, more generally be referred to as a touch screen or touch-sensitive element of the touch-sensitive apparatus 1, while the measurement circuitry 105 and processing circuitry 106 may, collectively, be referred to as the controller of the touch-sensitive apparatus 1.

The touch screen is primarily configured for establishing the presence and/or position of a touch (or multiple touches) within a two-dimensional sensing area by providing Cartesian coordinates along an X-direction (horizontal in the figure) and a Y-direction (vertical in the figure). In this implementation, the sensor element 100 is constructed from a substrate 103 that could be glass or plastic or some other insulating material and upon which is arranged an array of electrodes (referred to herein as an electrode array) consisting of multiple laterally extending parallel electrodes, X-electrodes 101 (row electrodes), and multiple vertically extending parallel electrodes, Y-electrodes 102 (column electrodes), which in combination allow the position of a touch 109 to be determined. To clarify the terminology, and as will be seen from FIG. 1, the X-electrodes 101 (row electrodes) are aligned parallel to the X-direction and the Y-electrodes 102 (column electrodes) are aligned parallel to the Y-direction. Thus the different X-electrodes allow the position of a touch to be determined at different positions along the Y-direction while the different Y-electrodes allow the position of a touch to be determined at different positions along the X-direction. That is to say in accordance with the terminology used herein, the electrodes are named (in terms of X- and Y-) after their direction of extent rather than the direction along which they resolve position. Furthermore, the electrodes may also be referred to as row electrodes and column electrodes. It will however be appreciated these terms are simply used as a convenient way of distinguishing the groups of electrodes extending in the different directions. In particular, the terms are not intended to indicate any specific electrode orientation. In general the term "row" will be used to refer to electrodes extending in a horizontal direction for the orientations represented in the figures while the terms "column" will be used to refer to electrodes extending in a vertical direction in the orientations represented in the figures. The X-electrodes 101 and Y-electrodes 102 define a sensing (or sense) area, which is a region of the substrate 103 which is sensitive to touch. In some cases, each electrode may have a more detailed structure than the simple "bar" structures represented in FIG. 1, but the operating principles are broadly the same.

The electrodes of the electrode array are made of an electrically conductive material such as copper or Indium Tin Oxide (ITO). The nature of the various materials used depends on the desired characteristics of the touch screen. For example, a touch screen may need to be transparent, in which case ITO electrodes and a plastic substrate are common. On the other hand a touch pad, such as often provided as an alternative to a mouse in laptop computers is usually opaque, and hence can use lower cost copper electrodes and an epoxy-glass-fibre substrate (e.g. FR4). Referring back to FIG. 1, the electrodes 101, 102 are electrically connected via circuit conductors 104 to measurement circuitry 105, which is in turn connected to control circuitry 106 by means of a circuit conductor 107. The measurement circuitry 105 and/or the control circuitry 106 may each be provided by a (micro) controller, processor, ASIC or similar form of control chip. Although shown separately in FIG. 1, in some implementations, the measurement circuitry 106 and the control circuitry 106 may be provided by the same (micro) controller, processor, ASIC or similar form of control chip. The measurement circuitry 105 and/or the control circuitry 106 may be comprised of a printed circuit board (PCB), which may further include the various circuit conductors 104, 107. The measurement circuitry 105 and the control circuitry 106 may be formed on the same PCB, or separate PCBs. Note also that the functionality provided by either of the measurement circuitry 105 and the control circuitry 106 may be split across multiple circuit boards and/or across components which are not mounted to a PCB.

Generally speaking, the measurement circuitry 105 is configured to perform capacitance measurements associated with the electrodes 101, 102. The measurement circuitry 105 includes elements capable of applying electrical signals (drive signals) for performing the capacitance measurements and for performing some processing of the raw capacitance measurements. As described in more detail below, the measurement circuitry 105 outputs at least indications of the capacitance measurements to the control circuitry 106.

The control circuitry 106 may be configured to perform a number of functions, including controlling the operations of the measurement circuitry 105. For example, the control circuitry 106 may send control signals to the various components forming the measurement circuitry 105 for controlling the operation of these components. In the described implementation, the control circuitry 106 is also provided with the capability to determine the presence of a touch 109, caused by an object such a human finger or a stylus coming into contact with (or being adjacent to) the sense area of the sensor element 100, based on an appropriate analysis of relative changes in the electrode array's measured capacitance/capacitive coupling. The control circuitry 106, may also be configured to, with appropriate analysis of relative changes in the electrode array's measured capacitance/capacitive coupling, calculate a touch position on the cover's surface as an XY coordinate 111. As described above, the functions of the control circuitry 106 may be provided across different circuit boards/components, and in the context of the implementation described above, it should be appreciated that dedicate circuit boards/components for the control of the measurement circuitry 105 and for processing of the capacitance measurements may be provided.

In the example of FIG. 1, a front cover (also referred to as a lens or panel) 108 is positioned in front of the substrate 103 and a single touch 109 on the surface of the cover 108 is schematically represented. Note that the touch itself does not generally make direct galvanic connection to the sensor 103 or to the electrodes 102. Rather, the touch influences the electric fields 110 that the measurement circuitry 105 generates using the electrodes 102 (described in more detail below).

A further aspect of capacitive touch sensors relates to the way the measurement circuitry 105 uses the electrodes of the sensor element 100 to make its measurements. There are two main techniques for measuring capacitance, one or both of which may be employed by the measurement circuitry 105 of the described implementation. That is to say, the measurement circuitry 105 is configured to determine capacitances of one or more of the electrodes of the electrode array using one or both of a first technique and a second technique.

Figure 2:
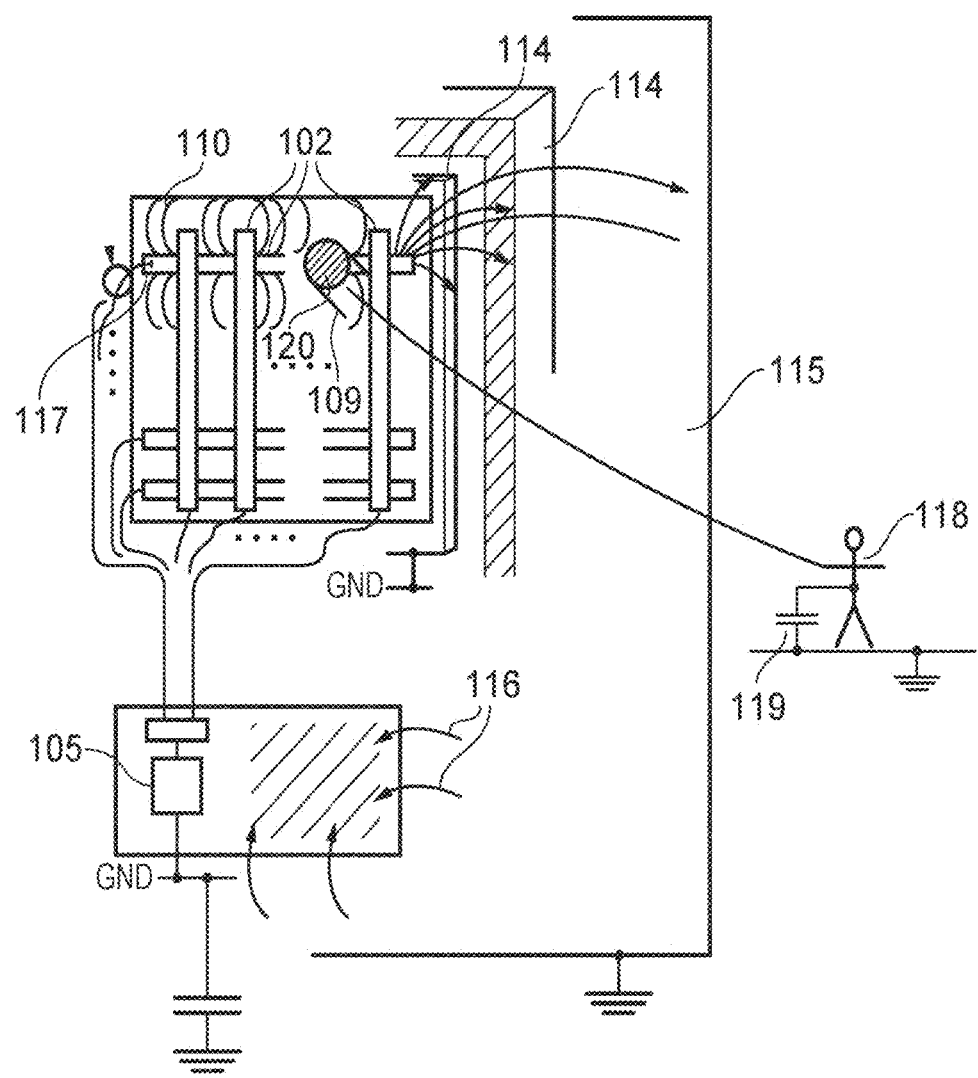
FIG. 2 schematically illustrates a self-capacitance measurement mode of the touch sensitive apparatus of FIG. 1, specifically with a view to explaining the principles of self capacitance measurement.

A first technique is based on measuring what is frequently referred to as "self-capacitance". Reference is made to FIG. 2. In FIG. 2, the measurement circuitry 105 is configured to generate and apply an electrical stimulus (drive signal) to each electrode 101, 102 which will cause an electric field 110 to form around it. This field 110 couples through the space around the electrode back to the measurement circuitry 105 via numerous conductive return paths that are part of the nearby circuitry of the sensor element 100 and the product housing (shown schematically by reference numeral 114), or physical elements from the nearby surroundings 115 etc., so completing a capacitive circuit 116. The overall sum of return paths is typically referred to as the "free space return path" in an attempt to simplify an otherwise hard-to-visualize electric field distribution. The important point to realise is that the measurement circuitry 105 is only driving each electrode from a single explicit electrical terminal 117; the other terminal is the capacitive connection via this "free space return path". The capacitance measured by the measurement circuitry 105 is the "self-capacitance" of the sensor electrode (and connected tracks) that is being driven relative to free space (or Earth as it is sometimes called) i.e. the "self-capacitance" of the relevant sensor electrode. Touching or approaching the electrode with a conductive element, such as a human finger, causes some of the field to couple via the finger through the connected body 118, through free space and back to the measurement circuitry 105. This extra return path 119 can be relatively strong for large objects (such as the human body), and so can give a stronger coupling of the electrode's field back to the measurement circuitry 105; touching or approaching the electrode hence increases the self-capacitance of the electrode. The measurement circuitry 105 is configured to sense this increase in capacitance. The increase is strongly proportional to the area 120 of the applied touch 109 and is normally weakly proportional to the touching body's size (the latter typically offering quite a strong coupling and therefore not being the dominant term in the sum of series connected capacitances).

In the described implementation, the electrodes 101, 102 are arranged on an orthogonal grid, generally with a first set of electrodes on one side of a substantially insulating substrate 103 and the other set of electrodes on the opposite side of the substrate 103 and oriented at substantially 90° to the first set. In other implementations, the electrodes may be oriented at a different angle (e.g., 30°) relative to one another. In addition, it should also be appreciated that it is also possible to provide structures where the grid of electrodes is formed on a single side of the substrate 103 and small conductive bridges are used to allow the two orthogonal sets of electrodes to cross each other without short circuiting. However, these designs are more complex to manufacture and less suitable for transparent sensors. Regardless of the arrangement of the electrodes, broadly speaking, one set of electrodes is used to sense touch position in a first axis that we shall call "X" and the second set to sense the touch position in the second orthogonal axis that we shall call "Y".

When the measurement circuitry 105 operates in accordance with the self-capacitance measuring mode, the measurement circuitry 105 can either drive each electrode in turn (sequential) with appropriate switching of a single control channel (i.e., via a multiplexer) or it can drive them all in parallel with an appropriate number of separate control channels. In the former sequential case, any neighbouring electrodes to a driven electrode are sometimes grounded by the measurement circuitry 105 to prevent them becoming touch sensitive when they are not being sensed (remembering that all nearby capacitive return paths will influence the measured value of the actively driven electrode). In the case of the parallel drive scheme, the nature of the stimulus applied to all the electrodes is typically the same so that the instantaneous voltage on each electrode is approximately the same. The drive to each electrode is electrically separate so that the measurement circuitry 105 can discriminate changes on each electrode individually, but the driving stimulus in terms of voltage or current versus time, is the same. In this way, each electrode has minimal influence on its neighbours (the electrode-to-electrode capacitance is non-zero but its influence is only "felt" by the measurement circuitry 105 if there is a voltage difference between the electrodes).

Figure 3:
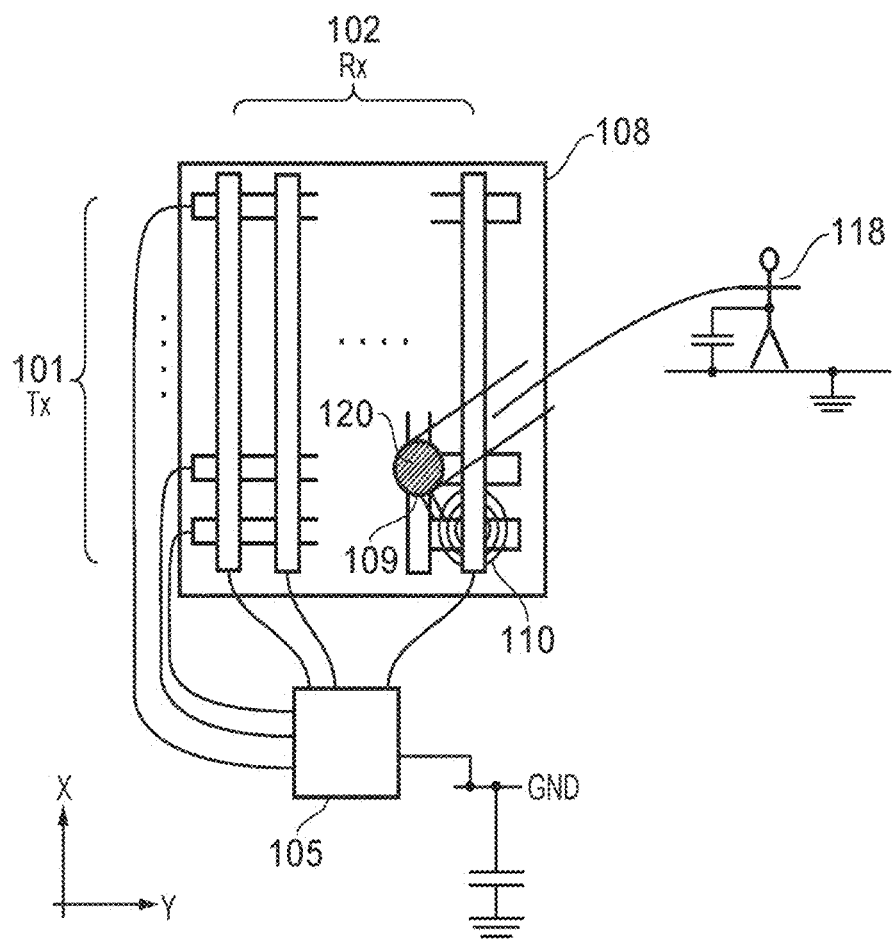
FIG. 3 schematically illustrates a mutual-capacitance measurement mode of the touch sensitive apparatus of FIG. 1, specifically with a view to explaining the principles of mutual capacitance measurement.

A second technique is based on measuring what is frequently referred to as "mutual-capacitance". Reference is made to FIG. 3. In FIG. 3, the measurement circuitry 105 will sequentially stimulate each of an array of transmitter (driven/drive) electrodes, shown as the X electrodes 101 in FIG. 3, that are coupled by virtue of their proximity to an array of receiver electrodes, shown as the Y electrodes 102 in FIG. 3. (It should be appreciated that the Y electrodes 102 may instead be the transmitting electrodes and the X electrodes 101 may instead be the receiving electrodes in other implementations). The resulting electric field 110 is now directly coupled from the transmitter to each of the nearby receiver electrodes; the "free space" return path discussed above plays a negligible part in the overall coupling back to the measurement circuitry 105 when the sensor element 100 is not being touched. The area local to and centred on the intersection of a transmitter and a receiver electrode is typically referred to as a "node" or "intersection point". Now, on application or approach of a conductive element such as a human finger, the electric field 110 is partly diverted to the touching object. An extra return path to the measurement circuitry 105 is now established via the body 118 and "free-space" in a similar manner to that described above. However, because this extra return path acts to couple the diverted field directly to the measurement circuitry 105, the amount of field coupled to the nearby receiver electrode 102 decreases. This is measured by the measurement circuitry 105 as a decrease in the "mutual-capacitance" between that particular transmitter electrode and receiver electrodes in the vicinity of the touch 109. The measurement circuitry 105 senses this change in capacitance of one or more nodes. For example, if a reduction in capacitive coupling to a given Y-electrode is observed while a given X-electrode is being driven, it may be determined there is a touch in the vicinity of where the given X-electrode and given Y-electrode cross, or intersect, within the sensing area of the sensor element 100. The magnitude of a capacitance change is nominally proportional to the area 120 of the touch (although the change in capacitance does tend to saturate as the touch area increases beyond a certain size to completely cover the nodes directly under the touch) and weakly proportional to the size of the touching body (for reasons as described above). The magnitude of the capacitance change also reduces as the distance between the touch sensor electrodes and the touching object increases.

As described above, the transmitter electrodes and receiver electrodes in the described implementation are arranged as an orthogonal grid, with the transmitter electrodes on one side of a substantially insulating substrate 103 and the receiver electrodes on the opposite side of the substrate 103. This is as schematically shown in FIG. 3. As in FIG. 2, the first set of transmitter electrodes 101 shown on one side of a substantially insulating substrate 103 and the second set of receiver electrodes 102 is arranged at nominally 90° to the transmitter electrodes on the other side of the substrate 103. In other implementations, the electrodes may be oriented at a different angle (e.g., 30°) relative to one another. In addition, other implementations may have structures where the grid is formed on a single side of the substrate and small insulating bridges, or external connections, are used to allow the transmitter and receiver electrodes to be connected in rows and columns without short circuiting.

There are certain advantages and disadvantages associated with both of the two capacitive sensing techniques described above. Mutual capacitance techniques offer the ability to resolve multiple touches at different locations on the touch-sensitive element. While self-capacitance techniques do not, as a matter of course, provide this functionality, self-capacitance techniques generally output a much stronger signal thus potentially increasing the sensitivity of the touch-sensitive element. In accordance with the principles of the present invention, the measurement circuitry 105 may be configured to operate in either of the self-capacitance and/or mutual capacitance techniques depending on the application at hand.

Figure 4:
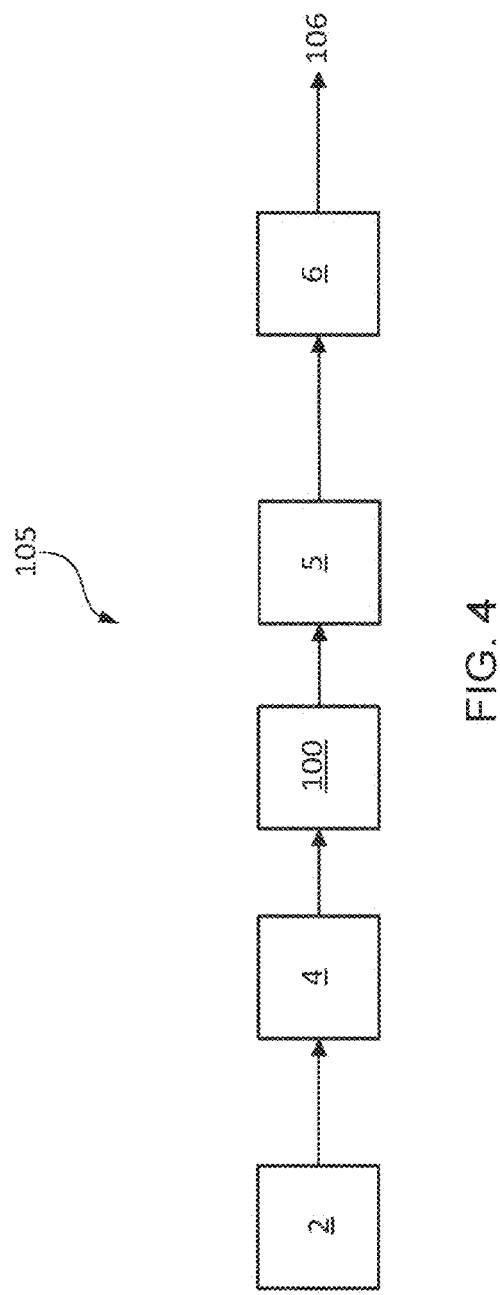
FIG. 4 schematically illustrates the measurement circuitry of the touch sensitive apparatus of FIG. 1 in more detail in accordance with certain embodiments of the invention.

FIG. 4 schematically shows an example measurement circuitry 105 in more detail.

The measurement circuitry 105 of FIG. 4 comprises a digital signal generating module 2, a digital to analogue converter (DAC) 4, a differential amplifier 5, and an analogue to digital converter (ADC) 6.

The digital signal generating module 2 is configured to generate a digital signal. The digital signal represents a time-varying wave, for example a sinusoidal wave. The sinusoidal wave may have a single frequency component.

Accordingly, the term "digital signal" as used herein should be understood to encompass a signal which may take one of a plurality of finite levels (or discrete values) at any given time. This of course is in contrast to an analogue signal which represents a continuous range of values. Each of the discrete values of the digital signal may be represented in an appropriate way, for example each discrete value may be represented by a binary or hex code. The "code" herein is generally referred to as a "digital code" to encompass the fact the code could be represented digitally in one of a number of ways, e.g., binary or hex code. Accordingly, as used herein, reference to an "n-bit" digital signal refers to a digital signal that includes an n-bit digital code that represents one of the plurality of discrete values. That is, each of the discrete values may be represented by a specific number of bits; e.g., a 3-bit binary code may represent any one of $2^3$ (i.e., 8) discrete values. Generally, the greater the number of discrete values to choose from, the greater the possibility of more accurately approximating a continuous analogue signal, such as the sinusoidal analogue wave. The skilled person will appreciate, however, that any suitable way of representing the digital signal may be employed in accordance with the principles of the present disclosure.

The digital signal generating module 2 may be provided with any suitable components required to generate and output the digital signal. For example, the digital signal generating module 2 may comprise a continuous digital sequence e.g., of n-bit binary codes, each representing one of a series of discrete values located in a memory or the like (i.e., a pre-stored sequence of codes representing the discrete values as a function of time).

The digital signal is output from the digital signal generating module 2 and is sent to the DAC 4. The DAC 4 is configured to convert the digital signal to an analogue drive signal capable of being applied to an electrode 101, 102 of the electrode array of the sensing element 100. In essence, the DAC 4 is configured to receive the sequence of digital codes output from the signal generating module 2 representing the sequence of discrete values of the digital signal and convert these discrete values into a smooth analogue signal representing a physical quantity, which in this case is a voltage. The DAC 4 may for instance assign each of the discrete values of the digital signal to a given voltage level at a given time in accordance with the timings of the digital signal. This provides a series of voltage points over time. The DAC 4 may use suitable interpolation techniques, e.g., using a reconstruction filter, to "fill in" the spaces between the series of voltage points to generate a smooth and continuous voltage. The DAC 4 in FIG. 4 may comprise any suitable DAC capable of converting the digital signal to an analogue voltage signal. In some implementations, the DAC 4 may be a digital noise-shaping sigma-delta converter.

The analogue voltage signal (or drive signal) output by the DAC 4 is subsequently applied to the sensor element 100, or more specifically, to the electrodes 101 and 102. The analogue voltage signal output by the DAC 4 may be referred to as an analogue drive signal. The sensor element 100 is effectively an impedance to be measured, which may be influenced by a number of factors including the presence of an object or a touch 109 on or in the vicinity of the electrodes of the sensor element 100.

As described above, the technique by which the touch-sensitive apparatus 1 detects changes in capacitive coupling may be the self-capacitance technique and/or the mutual capacitance technique. Accordingly, in the self-capacitance technique, the analogue voltage signal output by the DAC 4 is applied to an electrode of the electrode array and a corresponding parameter indicative of the self-capacitance of the electrode (such as a voltage/current) is able to be obtained. In the mutual capacitance technique, the analogue voltage signal output by the DAC 4 is applied to an electrode of the electrode array, e.g., a transmission electrode 101, and a corresponding parameter indicative of the mutual capacitance between the transmission electrode 101 and a receiving electrode 102 (such as a voltage/current) is able to be obtained. The operation of the sensor element 100 is explained in more detail above and is not repeated here for conciseness.

In any case, the output from the sensor element 100 is an analogue signal which is based on the analogue drive signal output by the DAC 4. In other words, the received analogue signal from either the transmission electrode 101 in the self-capacitance sensing mode, or from the receiving electrode 102 in the mutual capacitance sensing mode has a component which varies in time in a similar manner to the variations in time for the analogue drive signal. For example, if the analogue drive signal is a single-frequency, sinusoidal wave, the received analogue signal will comprise a component at that frequency.

In the example of FIG. 4, the received analogue signal is first passed through differential amplifier 5 and then to ADC 6.

The differential amplifier 5 is described in more detail below. The output (or outputs) from the differential amplifier 5 are passed to the ADC 6. The ADC 6 is broadly configured to work in a similar manner to the DAC 4 but in reverse. That is, the ADC 6 converts the received analogue voltage signal passed through the differential amplifier 5 into one or more digital signals. The output of the ADC 6 is therefore one or more digital signals representing the received analogue signal output from the sensor element 100 and passed through the differential amplifier 5.

The digital signal(s) output by the ADC 6 is/are herein referred to as the received digital signal(s) as they are a digital representation of the received analogue signal. As should be appreciated in light of the above description, the received digital signal has encoded within it a sinusoidal component that is related to the sinusoidal wave represented by the first digital signal. The ADC 6 may be configured to output any suitable digital signal. The ADC 6 in FIG. 4 may comprise any suitable ADC capable of converting the received analogue voltage signal to the received digital signal. In some implementations, the ADC 6 may output a multi-bit digital signal by assigning discrete values to the received analogue signal. In some examples, the ADC 6 is configured to sample the received analogue voltage signal at a sampling frequency, and subsequently quantise the sampled values into one of a plurality of discrete values. This general approach to analogue signal processing may more conventionally be known as pulse code modulation. The set of discrete values the ADC 6 may assign may be the same set of discrete values used by the digital signal generating module 2. In alternative implementations, however, the number of discrete values used by the ADC 6 (that is, the number of bits of the digital signal output by the ADC 6) may be different to the number of discrete values used by the digital signal generating module 2. Generally, ADCs that output a lower-bit digital signal are easier and cheaper to implement than ADCs that output a higher bit signal but are generally of a lower resolution. Thus, a balance may be struck between cost/efficiency and resolution of the signal for the specific application at hand. In other implementations, the ADC 6 may output a single or one-bit digital signal. In this regard, the one-bit digital signal may encode the relative magnitude of the received analogue signal at any given time by the number of single bits output in a given time period of the one-bit digital signal (or in other words, the frequency of the output bits). In these implementations, the ADC 6 may be a sigma-delta ADC. It should be appreciated that, depending on the specifics of the application at hand, any suitable ADC may be employed as the ADC 6 in the measurement circuitry 105.

The output from the ADC 6 is passed to the control circuitry 106 which, as stated above, may be configured to determine the presence/absence of a touch 109 and/or a position (i.e., X and Y coordinates) of the touch 109. The control circuitry 106 may compared the output from the ADC 6 (which is indicative of a measured capacitance) to an existing value (which may be a measure of the capacitance in the absence of a touch 109, e.g., obtained during manufacture or calibration of the touch sensitive apparatus 100). Based on a comparison, the control circuitry 106 may determine the presence/absence of a touch 109, e.g., if the measured capacitance deviates from the existing value by a predetermined amount.

It should be appreciated that the sensor element 100 may comprise a plurality of electrodes 101, 102 mentioned above, and the measurement circuitry 105 can be arranged to measure capacitances associated with each electrode 101, 102 and/or each intersection point of the electrodes 101, 102. For example, taking the electrode array of FIG. 1, there are seven horizontal (X) electrodes 101 and five vertical (Y) electrodes 102, meaning that in the self-capacitance sensing mode there is a potential of seven plus five, i.e., twelve, self-capacitance measurements that can be made, and in the mutual capacitance sensing mode there is the potential for seven times five, i.e., thirty-five mutual capacitance measurements that can be made. Thus, the measurement circuitry 105 may be configured to individually apply a drive signal to each of the electrodes of the electrode array and individually receive a receive signal from each of the electrodes of the electrode array, such that a plurality of received analogue signals may be received, amplified by differential amplifier 5, converted by ADC 6, and passed to the control circuitry 106 for processing. The touch sensitive apparatus 100 may comprise a plurality of DACs 4, a plurality of differential amplifiers 5, and a plurality of ADCs 6 each corresponding to the driven/receive electrodes, or alternatively a multiplexer or demultiplexer may be used to couple certain ones of the electrodes to a common DAC 4, amplifier 5, or ADC 6. The control circuitry 106 may be configured to identify the position of the touch 109 based on comparing the plurality of capacitance measurements to existing values (which may be an existing value common to all electrodes or a plurality of values for each of the electrodes/intersection points) using the principles discussed above.

As described above, the parameter indicative of a capacitive coupling may alter in the presence of a touch 109 and this generally manifests itself as a change in the amplitude of the time-varying component of the drive signal. For example, in the mutual capacitance sensing technique, in the presence of a touch 109, the capacitive coupling between the transmission electrode 101 and the reception electrode 102 decreases, and thus the received analogue signal is a time-varying signal having a reduced magnitude as compared to the time varying signal of the analogue drive signal. In the self-capacitance sensing technique, the presence of a touch 109 causes the capacitive coupling to increase thus resulting in a received analogue signal with a relatively larger magnitude as compared to the time-varying signal of the drive analogue signal.

However, the received analogue signal may also be influenced by other factors, including external noise. For example, the electronics within the touch-sensitive apparatus 100, electronics in the apparatus in which the touch-sensitive apparatus is installed or forms a part of, or electronics entirely separate from the touch-sensitive apparatus 100 may operate at certain frequencies (i.e., they use a time-varying voltage/current which can induce a current in electronic circuitry within proximity of the source of the time-varying voltage/current). Accordingly, this can lead to noise signals being superimposed on the true capacitance signal received from the electrode of the electrode array.

In touch sensitive system, the immunity towards external noise can be simplified to the following relationship:

SNR=signal amplitude of the drive signal/amplitude of the noise signal, where SNR is the signal-to-noise ratio.

This expression holds true for a wide band system without filtering. In a narrow band system (i.e., a filtered system or a sampled system) the amplitude of noise signal will be given as the remaining in-band noise signal after filtering (that is, the amplitude of the noise signal in the narrow frequency band).

To increase the immunity to noise (or to increase the SNR), one can either increase the signal amplitude of the drive signal, or, in filtered systems, change the frequency band that the system is susceptible to noise in. It is generally not possible to reduce the amplitude of the noise signal itself since this is dependent on the external source of the noise (in other words, it is a factor that is not directly controllable by the touch-sensitive apparatus or the designer of the touch-sensitive apparatus).

Increasing the signal amplitude, however, has certain design implications/limitations. In particular, this can lead to issues with dynamic range in the measurement system. For instance, if using an ADC, such as ADC 6 above, the ADC 6 will require increased resolution to maintain the same performance in low noise situations. As mentioned, the ADC 6 can effectively be thought of as a mapping between different voltage ranges of the input voltage signal to an output voltage value. E.g., an input value of 0 to 1 V may map to an output value of 0.5 V, an input value of 1 to 2 V may map to an output value of 1.5 V, etc. A given ADC will typically have a fixed number of output states (or voltages in this case). To make most efficient use of the ADC, the maximum possible range for the input signal (sometimes referred to as the swing of the input signal) is effectively divided up to form voltage ranges that map to the different output states/voltages. Increasing the swing of the input voltage (e.g., for example by increasing the swing from +3 v to −3V to +5V to −5V) while maintaining the same number of outputs increases the voltage range of the input signal assigned to any one of the outputs, thereby decreasing the resolution achievable by the same ADC. Accordingly, to provide the same performance/resolution of the ADC, the number of output states needs to be increased which typically increases the area required for the circuitry (i.e., the silicon area for an integrated circuitry) and also power consumption.

Figure 5:
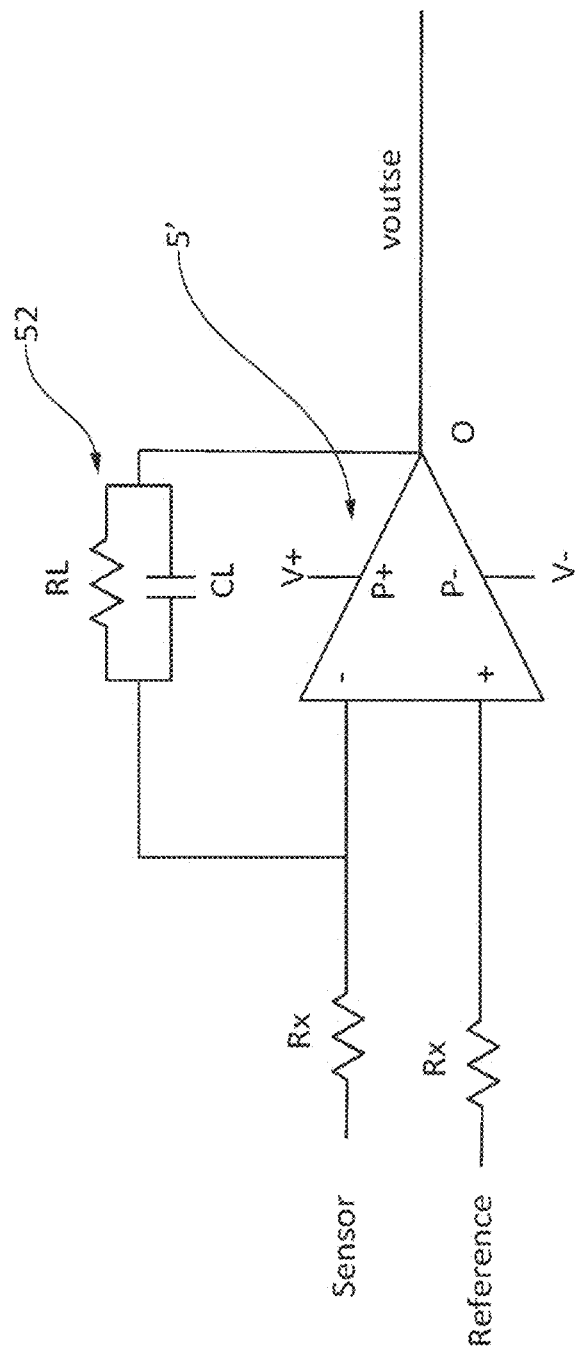
FIG. 5 schematically illustrates an example differential amplifier for use with the measurement circuitry of FIG. 4.

FIG. 5 is a schematic diagram showing an example of a differential amplifier 5' which may be used as the amplifier 5 in the apparatus of FIG. 1. The differential amplifier 5' is provided as an example only and highlights some of the issues described above with using amplifiers to amplify the signal amplitude. The differential amplifier 5' shown in FIG. 5 is referred to in some instances as a standard operational amplifier but is referred to herein as differential amplifier 5'.

The differential amplifier 5' of FIG. 5 comprises two signal input terminals, labelled "+" (positive) and "−" (negative) in FIG. 5. The signal input terminals are coupled to signal input lines, for example wiring or traces provided in the touch-sensitive apparatus. More specifically, coupled to the "−" (negative) input terminal of the differential amplifier 5' is an input signal line for receiving a sensor signal, and coupled to the "+" (positive) terminal of the differential amplifier 5' is a reference signal line for receiving a reference signal.

By way of a concrete example, the operation of the differential amplifier 5' will be explained in the context of a touch sensitive apparatus 1 operating in the self-capacitance sensing mode. In the self-capacitance sensing mode, a time-varying voltage signal (sometimes referred to as the drive signal) is applied to an electrode of the sensor element 100 as described above, and a time-varying voltage signal indicative of the self-capacitance of the respective electrode of the sensor element 100 is output from the sensor element 100. The output signal from the sensor element 100 is referred to herein as the sensor signal and, as described above, in the present example is an analogue, time-varying voltage signal indicative of the self-capacitance of an electrode of the sensor element 100. The reference signal in this example is also time-varying voltage signal. Broadly speaking, the reference signal takes the same form as the sensor signal (e.g., a voltage signal). The reference signal may be generated by a separate oscillator or other time-varying voltage signal generator which is coupled to the "+" input terminal, and in this regard, any suitable time-varying voltage signal may be used. Thus, the differential amplifier 5' in this example is configured to receive two time-varying voltage signals as the two inputs to the differential amplifier 5'.

The differential amplifier 5' also comprises a single output terminal labelled O in FIG. 5. The output terminal is configured to output the amplified signal from the sensor element, indicated in FIG. 5 by Voutse. The output signal Voutse is passed to the ADC 6 and is subsequently converted to a digital signal as described above in relation to FIG. 4.

Additionally, the differential amplifier 5' comprises power input terminals, denoted "P+" (positive power input terminal) and "P−" (negative power input terminal). The power input terminals are respectively coupled to the positive and negative sides of a power source for providing power to the differential amplifier 5'. The power source may be any suitable power source that can be applied to the differential amplifier 5', for example, a DC power source supplying a constant current to the differential amplifier 5'. The power source may be an external power source, such as a separate DC power supply or an internal power source, e.g., a DC power rail of an integrated circuit supplying a DC voltage to the touch sensitive apparatus 1 and/or the measurement circuitry 105. The skilled person will appreciate that any suitable power source, providing suitable operating power to the differential amplifier, may be used in accordance with the principles of the present disclosure.

Finally, the differential amplifier 5' comprises a feedback loop 52. The feedback loop comprises a resistor RL and a capacitor CL. The feedback loop 52 couples the parallel arrangement of the capacitor CL and resistor RL to the input terminal on which the sensor signal is input (the negative "−" input terminal) and to the output O of the differential amplifier 5' as shown in FIG. 5. The feedback loop 52 essentially acts to feedback the output signal back to the respective input terminal. Broadly speaking, the resistor RL plays a part in the overall gain of the differential amplifier 5', along with the resistor(s) Rx (where Rx is the resistance on the respective input signal lines, shown schematically by a resistor Rx in FIG. 5, but it should be appreciated that the resistor Rx may be a physical resistor and/or a representation of the collective resistances on the input signal line).

The operation of the differential amplifier 5' is now explained. The purpose of a differential amplifier broadly speaking is to amplify the difference between signals input to the differential amplifier (that is, in FIG. 5, the difference between the sensor signal and the reference signal) and to reject any commonalities between the input signals.

Without wishing to be bound by theory, when the gain of the differential amplifier 5' is set to 1 (which is determined by the value of the resistors RL and Rx—setting RL to be equal to Rx means that the gain of the differential amplifier 5' is unity (or one)), the output of the differential amplifier 5' is equal to the input. Moreover, because of the way in which the differential amplifier 5' is structured and operates, the two inputs on the negative "−" input terminal and positive "+" input terminal are forced or dragged towards one another. For example, if the signal on the negative "−" input terminal increases from 1 V to 2 V, then the signal on the positive "+" input terminal also increases from 1 V to 2 V (and this results in electrical current being "pushed out" to the sensor element 100).

Figure 6:
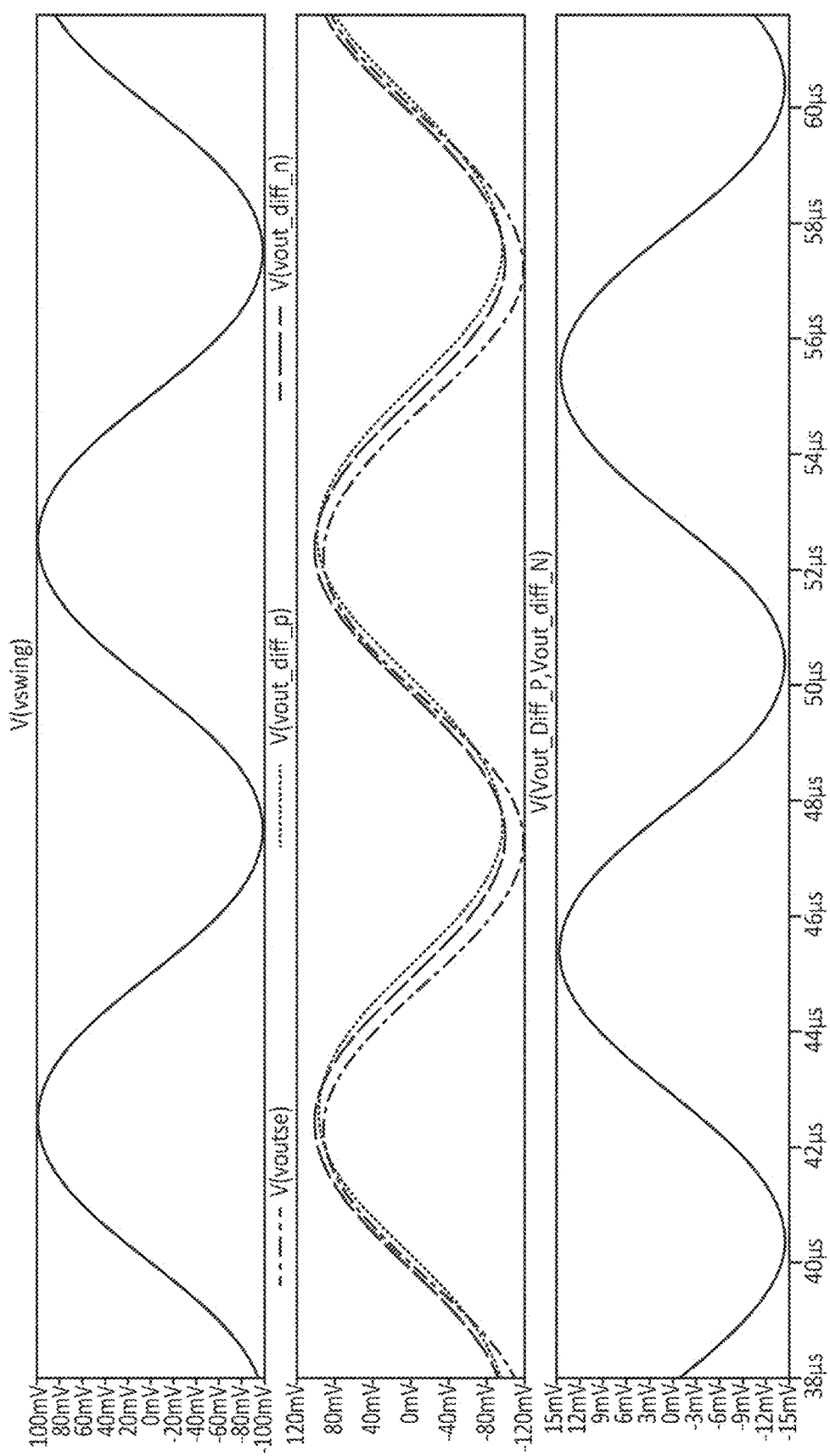
FIG. 6 is a graph showing a variety of voltage signals with time input or output from the example differential amplifier of FIG. 5 and a differential amplifier of FIG. 7 as used in accordance with certain embodiments of the invention.

FIG. 6 is a series of three-graphs representing voltage in mV (on the y-axis) and time in μs (on the x-axis).

The uppermost graph of FIG. 6 is a representation of an example reference voltage signal. The reference voltage signal, labelled V(Vswing) in FIG. 6 has a signal swing of around 200 mV (that is, peak-to-peak the signal spans around 200 mV) and a frequency of around 200 kHz. However, it should be appreciated that reference signals having different parameters may be used in accordance with the present disclosure, as discussed above.

The middle graph of FIG. 6 shows representations of three separate traces. For the present discussion, we focus only on the third trace, labelled V(voutse) and shown in green. V(voutse) is a representation of the output V(voutse) from differential amplifier 5' when the voltage signal V(Vswing) is applied to the positive "+" input terminal of the differential amplifier 5'. What should be noted here is that the signal V(voutse) is to the reference signal V(Vswing). In other words, the signal V(voutse) has a main/predominate component which is based on the reference signal V(Vswing). Conversely, the component of the signal V(voutse) from the sensor signal V(Vsensor) is relatively small in comparison to the component from the reference signal V(Vswing).

Accordingly, changes in the sensor signal Vsignal (i.e., voltage changes caused by the capacitive influence of objects interacting with the sensor element 100) are a relatively small proportion of the signal V(voutse). As described above, when passing the analogue signal V(vouste) to the ADC 6 to be digitised, the ADC 6 has a plurality of discrete output voltages which different input signal ranges are assigned to. Assuming an ADC 6 has a maximum number of discrete outputs of say 100, for a maximum input signal swing of e.g., +/−220 mV, each output of the ADC covers a range of 4.4 mV of the input signal. Assuming the change in voltage in the signal output from the sensor element is on the order of 10 mV, this means only four to six of the 100 discrete outputs are actually used for sensing whether an object is sensed or not. This can lead to decreased performance (e.g., reduced sensitivity).

Figure 7:
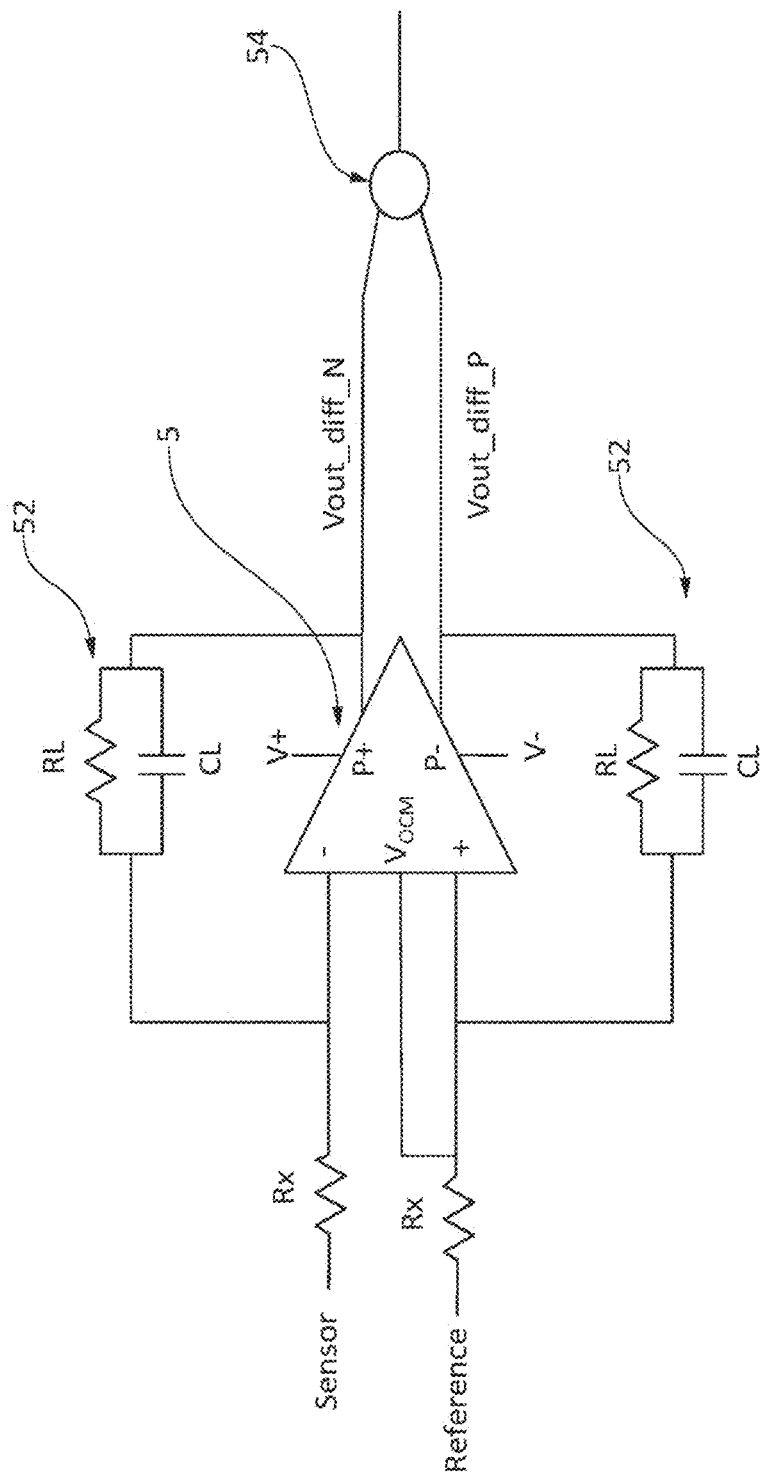
FIG. 7 schematically illustrates a differential amplifier for use with the measurement circuitry of FIG. 4 in accordance with first embodiments of the invention.

Thus, in accordance with aspects of the present disclosure, approaches have been devised to improve the performance of touch-sensitive systems using a differential amplifier. FIG. 7 is a schematic diagram showing a differential amplifier 5 which may be used as the amplifier 5 in the apparatus of FIG. 1 according to a first aspect of the present disclosure. That is, the differential amplifier 5 of FIG. 7 may be used in place of the differential amplifier 5' of FIG. 5 in the system of FIG. 1. To avoid repetition, like components common to the differential amplifier 5' of FIG. 5 and the differential amplifier 5 of FIG. 7 are represented with the same reference numerals and a detailed description thereof is not repeated. The differential amplifier of FIG. 7 is what is referred to as a fully differential amplifier 5. Also shown in FIG. 7 are feedback loops 52 coupled to the input and outputs of the differential amplifier 5, and a subtractor 54 coupled to the outputs of the differential amplifier 5.

The differential amplifier 5 of FIG. 7 similarly includes two signal input terminals, labelled "+" (positive) and "−" (negative) in FIG. 7. As with FIG. 5, the signal input terminals are coupled to signal input lines, for example wiring or traces provided in the touch-sensitive apparatus. More specifically, coupled to the "−" (negative) input terminal of the differential amplifier 5 is an input signal line for receiving a sensor signal, and coupled to the "+" (positive) terminal of the differential amplifier is a reference signal line for receiving a reference signal. The operation of the differential amplifier 5 will be explained in the context of a touch-sensitive apparatus 1 operating in the self-capacitance sensing mode, and broadly speaking, the same signals that are input to the differential amplifier 5' are able to be input into the differential amplifier 5 of FIG. 7 and a detailed description of these signals is omitted here.

In this example, the differential amplifier 5 is a voltage amplifier configured to receive the sensor signal (the output signal from the sensor element 100) and the reference signal, both of which are time-varying voltage signals. However, it should be appreciated that the principles of the present disclosure may be applied to other types of differential amplifiers, which may alternatively use different inputs, e.g., time-varying current signals, and may output time-varying voltage signals or time-varying current signals. Broadly, the differential amplifier may be referred to as voltage differential amplifiers (voltage "in" and voltage "out"), current differential amplifiers (current "in" and current "out"), transconductance differential amplifiers (voltage "in" and current "out") or transresistance differential amplifiers (current "in" and voltage "out"). The skilled person may select a suitable differential amplifier in accordance with the particular implementation at hand.

The differential amplifier 5 of FIG. 7 also comprises a third signal input terminal, denoted $V_{OCM}$. This is referred to as the common mode voltage signal input terminal and is used to set the desired common mode voltage about which the output signals of the differential amplifier 5 are provided. As can be seen in FIG. 7, the reference signal is also provided to the third signal input; that is, the reference signal is set as the desired common mode voltage in the arrangement of FIG. 7. However, in principle, a different signal (i.e., not the reference signal) may be input to the third input signal terminal. In accordance with the aspects of the present example, however, the signal input to the third signal input terminal is also a time-varying voltage signal. The signal received on the third input terminal may be referred to as the desired common mode input signal or desired common mode voltage.

Additionally, as with the differential amplifier 5' of FIG. 5, the differential amplifier 5 comprises power input terminals, also denoted with "P+" (positive) and "P−" (negative) symbols in FIG. 7. The power input terminals are respectively coupled to a power source for providing power to the differential amplifier 5, and any suitable power source that can be applied to the differential amplifier 5 may be employed, as described previously. In contrast to FIG. 5, the differential amplifier 5 of FIG. 7 comprises two output terminals, denoted herein as the negative output terminal and the positive output terminal. The output terminals are coupled to output signal lines/traces, and provide time-varying voltage signals Vout_diff_N and Vout_diff_P respectively. More specifically, the time-varying voltage signal Vout_diff_N is output at the negative output terminal of the differential amplifier 5 and the time-varying voltage signal Vout_diff_P is output at the positive output terminal of the differential amplifier 5. The time-varying voltage signals Vout_diff_N and Vout_diff_P are described in more detail below.

The differential amplifier of FIG. 7 comprises multiple feedback loops 52, each comprising a resistor RL and a capacitor CL, unlike the differential amplifier 5' of FIG. 5 which comprises only a single feedback loop. A feedback loop is provided that couples the parallel arrangement of the capacitor CL and resistor RL to one of the inputs to the differential amplifier 5 and to the respective output of the differential amplifier 5 as shown in FIG. 7. More explicitly, there exists a first feedback loop 52 comprising a parallel arrangement of the capacitor CL and resistor RL connected between the "+" (positive) input terminal on which the sensor signal is provided to the differential amplifier and the output terminal on which the signal Vout_diff_N is provided, and a second feedback loop 52 comprising a parallel arrangement of the capacitor CL and resistor RL connected between the "−" (negative) input terminal on which the reference signal is provided to the differential amplifier and the output terminal on which the signal Vout_diff_P is provided. The feedback loops 52 essentially act to feedback the output voltage (i.e., Vout_diff_N or Vout_diff_P) back to the respective input terminal. The feedback loops 52 couple the output terminal of the differential amplifier 5 (i.e., the output terminal providing the output signals Vout_diff_N or Vout_diff_P) to the respective input terminal of the differential amplifier 5 in a unity gain configuration and, as discussed in more detail below, allows for the output voltage signal (i.e., Vout_diff_N or Vout_diff_P) to track the respective input signal.

Broadly speaking, the resistor RL plays a part in the overall gain of the differential amplifier 5 where, for a given feedback loop, the gain is equal to RL/Rx, where Rx is the resistance on the various input signal lines, shown schematically by a resistor Rx in FIG. 7. The resistor Rx may be a physical resistor and/or a representation of the collective resistances on the input signal line. Hence, the resistor RL (and Rx) for a given loop can be set accordingly, e.g., to achieve the unity gain configuration above.

The feedback loops 52 are preferably matched (that is, the values of RL and CL are the same on both feedback loops) to avoid second (and higher) order harmonics being present on the various signals during feedback of the output voltage signals from the differential amplifier 5.

Also shown in FIG. 7 is a subtractor 54 that receives the output voltage signals Vout_diff_N and Vout_diff_P and subtracts one from the other. The subtractor, as explained in more detail below, removes the common voltage from each of the signals Vout_diff_N and Vout_diff_P and provides the difference (referred to herein as the differential signal) to, e.g., the ADC 6 (not shown in FIG. 7). The subtractor 54 may be any suitable electronic component, or collection of components, capable of subtracting the two signals Vout_diff_N and Vout_diff_P from each other. The output from the subtractor 54 is sometimes referred to herein as a subtracted signal.

The operation of the differential amplifier 5 of FIG. 7 is now explained.

The general function of the differential amplifier 5 is, as explained above, to amplify the differences between the input signals (in this example the sensor signal and the reference signal) and suppress any commonalities/common modes common to both input signals (the sensor signal and the reference signal). The two input signals, the sensor signal from the sensor element 100 and the reference signal, will typically differ from one another as a function of time during operation of the sensor element 100.

In the present example, the differential amplifier 5 is arranged so that the reference signal is also input to the $V_{OCM}$ terminal of the differential amplifier 5 and therefore acts as the desired common mode voltage of the differential amplifier 5. This desired common mode voltage effectively acts as the baseline around which the various output signals (Vout_diff_N and Vout_diff_P) are provided. The output signals from the differential amplifier 5, Vout_diff_P and Vout_diff_N, can essentially be thought of as the difference between the sensor signal and the reference signal relative to the desired common mode voltage, whereby the difference relative to the desired common mode voltage is either according to a first polarity (e.g., a positive or negative polarity) or a second polarity opposite the first polarity (e.g., a negative or positive polarity).

The desired common mode voltage effectively acts as the desired output for the differential amplifier 5. In other words, differential amplifier 5 seeks to output signals (e.g., Vout_diff_N and Vout_diff_P) which have a minimal difference with respect to the desired common mode voltage. In an idealised situation, if the sensor signal is equal to the reference signal, then the difference between the sensor signal and the reference signal is zero and the signals Vout_diff_N and Vout_diff_P are both equal to the desired common mode voltage. However, in the event that the sensor signal is not equal to the reference signal, then the signals Vout_diff_N and Vout_diff_P effectively represent the desired common mode voltage minus the difference between the sensor and reference signals (Vout_diff_N) the desired common mode voltage plus the difference between the sensor and reference signals (Vout_diff_P).

This is achieved in part by the feedback loops 52 described above which are provided to cause the various input signals and output signals to track (that is, to become aligned with as far as possible) the desired common mode voltage. Without wishing to be bound by theory, assuming two input signals differ from one another by Δ, then the two output signals of the differential amplifier 5 are effectively $V_{OCM}+\Delta$ and $V_{OCM}-\Delta$. When these signals are fed back to the input terminals, then for the sensor signal, $V_{OCM}$ starts to dominate and the input signal is essentially shifted towards $V_{OCM}$ plus the differential. In the case of the reference signal, then the input signal for the reference signal is shifted from $V_{OCM}$ by the differential. Accordingly, the desired common mode voltage is imparted to both signals input to the differential amplifier 5. Put another way, let us assume the difference between the sensor signal and the reference signal is a sinusoidal signal of, e.g., $A \sin(\omega t)$, where A is the amplitude of the sinusoidal wave, w is the angular frequency, and t is time. If the common mode voltage is represented as $V_{CM}$ then Vout_diff_P can be thought of as $V_{CM}+A \sin(\omega t)$ and Vout_diff_N can be thought of as $V_{CM}-A \sin(\omega t)$. That is, both output signals Vout_diff_P and Vout_diff_N comprise a common voltage component and a differential voltage component which is opposite in polarity. The two output signals Vout_diff_P and Vout_diff_N can be thought of as the difference between the sensor signal and the reference signal relative to the common mode voltage, and the difference between the reference signal and the sensor signal relative to the common mode voltage.

Therefore, the two output voltage signals Vout_diff_P and Vout_diff_N track one another according to the common mode voltage but vary according to the difference between the sensor signal and the reference signal. When passed to the subtractor 54, the common mode voltage is effectively removed and the output of the subtractor 54 is the differential signal absent any common signal present in the sensor signal and reference signal. That is, the subtractor 54 may output a differential signal, V(Vout_diff_P, Vout_diff_N) according to the following formula:

$$V(\text{Vout\_diff\_P}, \text{Vout\_diff\_N}) = \text{Vout\_diff\_P} - \text{Vout\_diff\_N} = V_{CM} + A\sin(\omega t) - (V_{CM} - A\sin(\omega t)) = 2A\sin(\omega t).$$

Hence, the output from the subtractor 54 provided to the ADC 6 is largely independent of any noise (or indeed any other commonalities) common to the sensor signal and the reference signal. It should also be noted that the amplitude of the differential signal is actually 2A sin(ωt), that is twice the amplitude with respect to the difference relative to the common mode voltage.

With reference back to FIG. 6, as mentioned the middle graph of FIG. 6 shows representations of three separate traces. A first trace, labelled V(vout_diff_p) and shown in blue, is representative of the output voltage signal Vout_diff_P, and a second trace, labelled V(vout_diff_n) and shown in red, is representative of the output voltage signal Vout_diff_N. The two signals are shown with a signal swing of around 200 mV and a frequency of around 200 kHz. As mentioned above, the two output voltage signals Vout_diff_P and Vout_diff_N are a measure of the difference between the sensor signal and the reference signal relative to the common mode voltage signal input at $V_{OCM}$ which in this instance (and in accordance with FIG. 7) is the reference signal shown in the uppermost graph of FIG. 6. The third trace, labelled V(voutse) has already been discussed above in relation to FIG. 5.

As can be seen from the middle graph, the three traces are broadly similar in that each have a signal swing of around +/−200 mV and a frequency of around 200 kHz. However, in contrast to the differential amplifier 5' of FIG. 5, the traces Vout_diff_P and Vout_diff_N are able to be subtracted from each other (and therefore are not directly input into the ADC 6). The lower graph of FIG. 6 represents the differential voltage signal, labelled V(Vout_diff_P, Vout_diff_N) and shown in pink. This is essentially the difference between the two output signals Vout_diff_P and Vout_diff_N, or mathematically, V(Vout_diff_P, Vout_diff_N)=Vout_diff_P−Vout_diff_N. The differential signal is obtained by subtracting the two signals Vout_diff_P−Vout_diff_N using the subtractor 54, and hence the subtractor 54 effectively removes the common voltage signal ($V_{CM}$) and adds the differences from the two output signals Vout_diff_P and Vout_diff_N.

The differential signal, V(Vout_diff_P, Vout_diff_N), is shown with a signal swing of around 32 mV, which is significantly less that the signal swing for, e.g., the reference signal of the uppermost graph of FIG. 6 and/or the output signal V(voutse) of around 200 mV.

Accordingly, if one were to map V(Vout_diff_P, Vout_diff_N) to an ADC with a fixed number of outputs, a much smaller voltage range covering the swing of V(Vout_diff_P, Vout_diff_N) can be mapped to each of the fixed number of outputs. This increases the resolution achievable by the ADC 6. For instance, taking the example above, if the ADC has around 100 discrete outputs, a signal swing of +/−32 mV corresponds to a voltage range of around 0.64 mV per discrete output from the ADC. Accordingly, due to the improved resolution, the overall system is able to discriminate low level noise in the sensor signal (e.g., caused by sources internal to the sensor element/touch sensitive apparatus) more readily and more reliably. In other words, a touch-sensitive apparatus employing a differential amplifier 5 as above is able to have improved low level noise performance.

Additionally, in the context of noise, n noise source generates a signal of a certain frequency component which interferes with the circuitry of the touch-sensitive apparatus, effectively superimposing the noise signal upon the received analogue signal (the sensor signal) from the sensor element 100. However, the same noise (or elements thereof) may also affect the reference signal in substantially the same way, particularly when the sensor signal line and reference signal line are spatially close to one another. That is, the noise electrically couples to the signal lines input to the differential amplifier 5 (and any other signal lines correspondingly coupled thereto). Accordingly, due to the way in which the differential amplifier 5 operates, the noise signal can be suppressed as noise common to both the sensor element signal and the reference signal can be removed.

The differential signal V(Vout_diff_P, Vout_diff_N) encodes information relating to the capacitive coupling of the electrode or electrode pair from which the received analogue signal (sensor signal) was received. For instance, if the sensor signal changes relative to the reference signal, e.g., due to a change in capacitive coupling caused by a touch 109, then the differential signal V(Vout_diff_P, Vout_diff_N) also changes.

Thus, in broad summary, the use of the differential amplifier 5 provides an output signal which offers a higher resolution signal and a low noise signal leading to the potential to provide more accurate and reliable determination of the presence and/or absence of a touch 109 on a touch sensitive surface of the touch-sensitive apparatus.

As stated above, the signal V(Vout_diff_P, Vout_diff_N) can be input to the ADC 6 which outputs a corresponding digital signal including information relative to the capacitive coupling associated with an electrode of the electrode array. The digital signal output from the ADC 6 is passed to the control circuitry 106, and the control circuitry 106 can determine the presence/absence of a touch 109 using any of the techniques mentioned above. For example, the control circuitry 106 can compare the magnitude of the differential signal V(Vout_diff_P, Vout_diff_N) to a threshold value. Because the internal noise is able to be more readily distinguished, the threshold value may be set such a relatively smaller change triggers the detection of a touch/object.

In addition, because the signal swing of the signal that is input into the ADC 6 is relatively smaller, one can increase the drive signal amplitude to improve the SNR. The amount that this signal may be increased may vary based on the low level noise performance that is desired for the system as a whole and/or any other undesired effects caused by increasing the amplitude of the drive signal.

Figure 8:
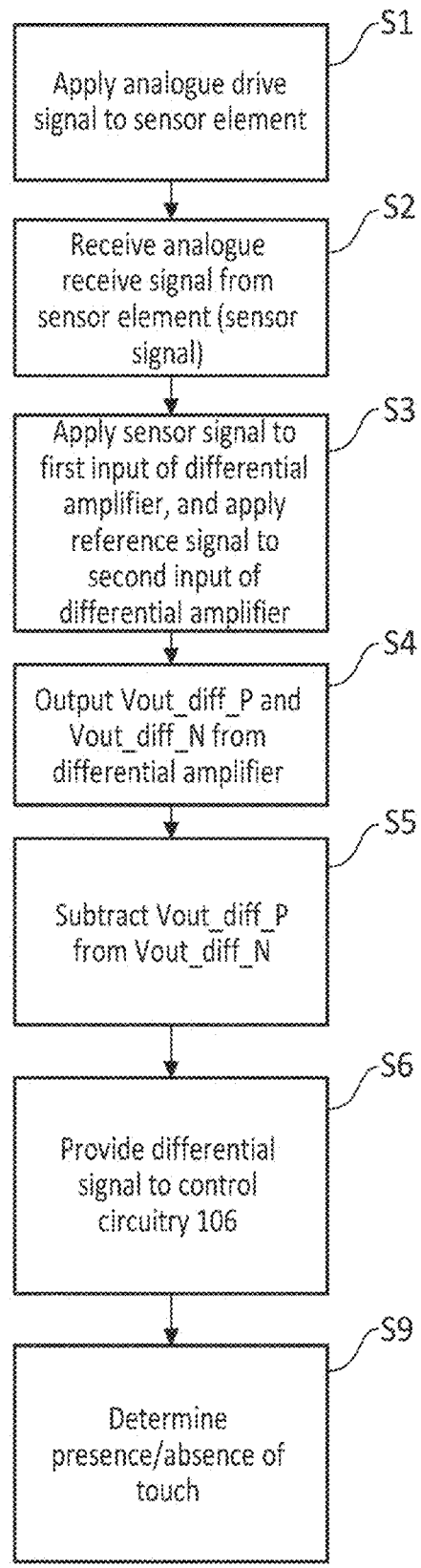
FIG. 8 shows a flow chart depicted method for determining the presence or absence of a touch using the output from the differential amplifier of FIG. 7.

FIG. 8 is a flow diagram representing a method of using the differential amplifier 5 in a touch-sensitive apparatus such as that shown in FIG. 4.

The method starts at step S1 where the analogue drive signal is applied to an electrode of the electrode array of the sensor element 100. As mentioned, this may be generated on the basis of a digital signal supplied to the DAC 4.

At step S2, the received analogue signal (or sensor signal) is received. This signal may be obtained from the electrode to which the analogue drive signal is applied (e.g., in the self-capacitance measurement mode), or from a receive electrode capacitively coupled to the drive electrode (in the mutual-capacitance measurement mode). The sensor signal contains an indication of the capacitive coupling for the associated electrode/electrodes.

At step S3, the sensor signal is applied to an input of the differential amplifier 5. For example, the sensor signal is applied to the "−" (negative) terminal input of the differential amplifier 5. At the same time, the reference signal is applied to the other input terminal, (i.e., the "+" (positive) input terminal).

At step S4, the differential amplifier 5 outputs the signals Vout_diff_P and Vout_diff_N, each of which is a signal that varies with the difference between the input sensor signal and the input reference signal.

At step S5, the two signals Vout_diff_P and Vout_diff_N are subtracted from one another to provide a differential (or subtracted) signal, V(Vout_diff_P, Vout_diff_N). Vout_diff_P may be subtracted from Vout_diff_N, or Vout_diff_N may be subtracted from Vout_diff_P.

At step S6, the differential (or subtracted) signal is V(Vout_diff_P, Vout_diff_N) is provided to the control circuitry 106 (via ADC 6).

At step S7, and potentially after a plurality of measurements have been made for each of the electrodes or electrode pairs of the sensor element 100, the control circuitry 106 determines the presence/absence of a touch on the basis of the differential (or subtracted) signal. More specifically, the ADC 6 receives the differential (or subtracted) signal output from the subtractor 54 and digitises the differential (or subtracted) signal. This digitised differential (or subtracted) signal is then input to the control circuitry 106 and used to make a decision as to whether or not a touch is detected.

Figure 9:
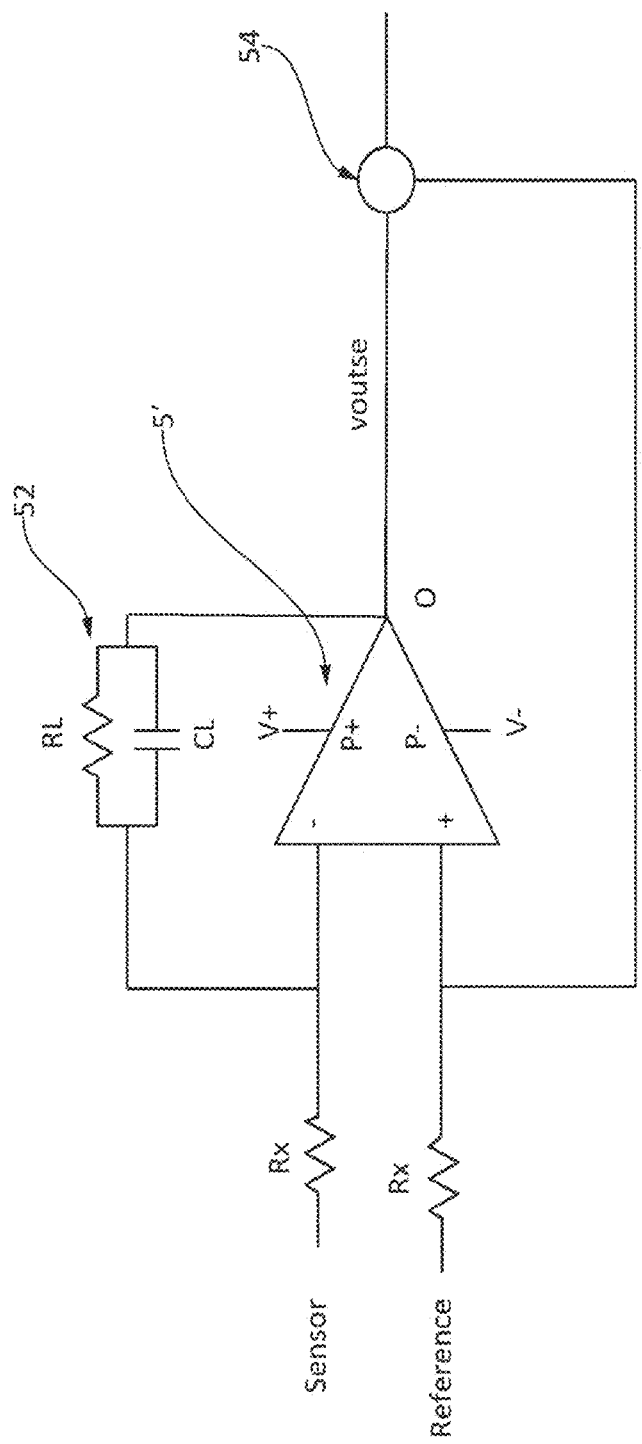
FIG. 9 schematically illustrates the differential amplifier of FIG. 5 and associated components for use with the measurement circuitry of FIG. 4 in accordance with second embodiments of the invention.

FIG. 9 is a schematic diagram showing a further example of a differential amplifier 5' and additional components used in accordance with the apparatus of FIG. 1 according to a second aspect of the present disclosure. More specifically, the differential amplifier of FIG. 9 is identical to the differential amplifier of FIG. 5. However, the differential amplifier 5' of FIG. 9 is provided in conjunction with a subtractor 54, which is substantially the same as subtractor 54 of FIG. 7.

In the example of FIG. 9, the configuration of, and hence the output of, the differential amplifier 5' is essentially the same as that of FIG. 5. In other words, the differential amplifier 5' of FIG. 9 outputs the signal V(voutse) as discussed previously. However, instead of passing the signal V(voutse) to the ADC 6 as previously described, the output signal V(voutse) is passed first to subtractor 54. In addition, the reference signal is also passed to the subtractor 54. Hence, the output of the subtractor 54 is actually the difference between the output of the differential amplifier 5' and the reference signal input to the differential amplifier 5' on the positive "+" input terminal, and it is this difference that is input to the ADC 6.

As described previously, the output signal V(voutse) comprises a predominant component which is based on the reference signal. Thus, by subtracting the reference signal from V(voutse) prior to passing a signal to the ADC means the predominate component of the signal V(voutse) can be removed. Accordingly, the signal swing of the signal input into the ADC 6 is decreased from around 200 mV (of the signal V(voutse)) to something on the order of 32 mV (e.g., similarly to the signal V(Vout_diff_P, Vout_diff_N) as described with respect to FIG. 7. Hence, similar advantages in terms of noise suppression and low noise may be realised with the arrangement of FIG. 9 as compared to the arrangement of FIG. 7. However, it should be understood that the performance of the arrangement of FIG. 9 may not be as high as the arrangement of FIG. 7 because any noise associated with the reference signal is effectively re-introduced into the signal input into the ADC 6 by virtue of that noise being present on the reference signal input into the subtractor 54. However, in certain applications, this noise may be tolerable.

It should be appreciated that while the above has described a touch-sensitive apparatus which generates digital signals that are passed to a DAC 4 and then on to an ADC 6, the present disclosure may equally apply to systems which are either fully analogue or partially analogue. That is, for example, DAC 4 may be omitted and instead of providing/generating a digital signal which is converted to an analogue signal, the touch sensitive apparatus may instead comprise a mechanism to generate an analogue signal (e.g., an oscillator or similar component). Alternatively and/or additionally, the ADC 6 may be omitted and the control circuitry 106 may be configured to receive the analogue voltage signals (or modified versions thereof, e.g., where common signals have been subtracted) from the differential amplifiers 5 or 5' and determine the presence or absence of a touch 109 based on the analogue voltage signals.

Moreover, it should be appreciated that while subtractor 54 has been shown as a separate component to ADC 6, in some implementations, the subtractor 54 may be integrated with the ADC 6. That is, the ADC 6 may receive two analogue signals and subtract these analogue signals before converting the signals to a digital signal that is ultimately output to the processing circuitry 106.

It should also be appreciated that while the differential amplifiers 5 and 5' are shown with the reference signal being input to the "+" (positive) terminal and the sensor signal being input to the "−" (negative) terminal, the signals may be input on the other of the input terminals instead.

It should also be appreciated that the above techniques may be used in conjunction with touch sensitive apparatuses employing the self-capacitance sensing technique and/or the mutual capacitance technique. However, the techniques described above find particular application, and offer greater benefits, for apparatuses operating in the self-capacitance sensing mode due, in part, to the relative signal strengths that can be achieved with the two different techniques. In addition, the undesired effects of increasing the amplitude of the drive signal in the mutual-capacitance mode of operation may be less than those that are incurred in the self-capacitance mode of operation.

Thus there has been described a touch-sensitive apparatus for sensing the presence of an object relative to a touch-sensitive surface using capacitance measurements. The apparatus includes an electrode array comprising at least one electrode, the electrode array providing the touch-sensitive surface; a signal generating module for generating a time-varying drive signal to be applied to the electrode array; a differential amplifier comprising: a first input configured to receive a time-varying sensor signal from an electrode of the electrode array, the sensor signal indicative of a capacitive coupling associated with the at least one electrode; a second input configured to receive a time-varying reference signal; a first output configured to output a first output signal from the differential amplifier based on a difference between the time-varying sensor signal and the time-varying reference signal; and control circuitry configured to determine the presence of an object, wherein the apparatus further comprises a subtractor for subtracting a signal from the first output signal from the differential amplifier to generate a subtracted signal, wherein the control circuitry is configured to receive a signal based on the subtracted signal and to determine the presence of an object based on the received signal. Further disclosed is a method for sensing the presence of an object relative to a touch-sensitive surface using capacitance measurements of a touch sensitive apparatus.

Further particular and preferred aspects of the present invention are set out in the accompanying independent and dependent claims. It will be appreciated that features of the dependent claims may be combined with features of the independent claims in combinations other than those explicitly set out in the claims.

The invention claimed is:

1. A touch-sensitive apparatus for sensing the presence of an object relative to a touch-sensitive surface using capacitance measurements, the apparatus comprising:
   an electrode array comprising a plurality of electrodes, the electrode array providing the touch-sensitive surface;
   a signal generating module for generating a time-varying drive signal to be applied to the electrode array;
   a differential amplifier comprising:
      a first input configured to receive a time-varying sensor signal from an electrode of the electrode array, the sensor signal indicative of a capacitive coupling associated with the electrode of the electrode array;
      a second input configured to receive a time-varying reference signal;
      a first output configured to output a first output signal from the differential amplifier based on a difference between the time-varying sensor signal and the time-varying reference signal; and
   control circuitry configured to determine the presence of an object,
   wherein the apparatus further comprises a subtractor for subtracting a signal from the first output signal from the differential amplifier to generate a subtracted signal,
   wherein the control circuitry is configured to receive a signal based on the subtracted signal and to determine the presence of an object based on the received signal.

2. The touch-sensitive apparatus of claim 1, wherein the differential amplifier is configured to amplify the difference between the time-varying sensor signal received from the electrode at the first input and the time-varying reference signal received at the second input, and to suppress the common components common to both the time-varying sensor signal received from the electrode at the first input and the time-varying reference signal received on the second input.

3. The touch-sensitive apparatus of claim 1, wherein the differential amplifier comprises a first output and a second output, wherein the differential amplifier is configured to output the first output signal at the first output and to output a second output signal at the second output, wherein the first output signal and the second output signal are both indicative of the difference between the time-varying sensor signal received from the electrode at the first input and the time-varying reference signal received at the second input.

4. The touch-sensitive apparatus of claim 3, wherein the subtractor is configured to subtract the first output signal from the second output signal to form the subtracted signal.

5. The touch-sensitive apparatus of claim 4, wherein the subtracted signal is provided to an analogue to digital converter, wherein the analogue to digital converter is configured to digitise the subtracted signal in accordance with a plurality of output states of the analogue to digital converter.

6. The touch-sensitive apparatus of claim 5, wherein the analogue to digital converter is configured such that the plurality of output states are arranged so as to cover the maximum signal swing of the subtracted signal.

7. The touch-sensitive apparatus of claim 3, wherein the differential amplifier comprises a third input, the third input configured to receive a time-varying common mode signal,
   wherein the first output signal is indicative of the difference between the time-varying sensor signal received from the electrode at the first input and the time-varying reference signal received at the second input relative to the time-varying common mode signal, and
   wherein the second output signal is indicative of the difference between the time-varying reference signal received at the second input and the time-varying sensor signal received from the electrode at the first input relative to the time-varying common mode signal.

8. The touch-sensitive apparatus of claim 7, wherein the differential amplifier is configured such that third input receives the time-varying reference signal.

9. The touch-sensitive apparatus of claim 1, wherein the differential amplifier comprises a single output, wherein the subtractor is configured to subtract the time-varying reference signal from the first output signal to form the subtracted signal.

10. The touch-sensitive apparatus of claim 9, wherein the subtracted signal is provided to an analogue to digital converter, wherein the analogue to digital converter is configured to digitise the subtracted signal in accordance with a plurality of output states of the analogue to digital converter.

11. The touch-sensitive apparatus of claim 10, wherein the analogue to digital converter is configured such that the plurality of output states are arranged so as to cover the maximum signal swing of the subtracted signal.

12. The touch-sensitive apparatus of claim 1, wherein the differential amplifier is a voltage amplifier, and wherein the time-varying sensor signal from the electrode of the electrode, the time-varying reference signal, and the first and/or second output signals are all time-varying voltage signals.

13. A method for sensing the presence of an object relative to a touch-sensitive surface using capacitance measurements of a touch sensitive apparatus comprising an electrode array comprising a plurality of electrodes, the electrode array providing the touch-sensitive surface, the method comprising:
   applying a time-varying drive signal to the electrode array;
   receiving a time-varying sensor signal from an electrode of the electrode array, the sensor signal indicative of a capacitive coupling associated with the electrode of the electrode array;
   applying the time-varying sensor signal to a first input of a differential amplifier, and applying a time-varying reference signal to a second input of the differential amplifier;
   outputting a first output signal based on the difference between the time-varying sensor signal received from the electrode at the first input and the time-varying reference signal received at the second input;

subtracting a signal from the first output signal from the differential amplifier to generate a subtracted signal; and determining the presence of an object using a signal based on the subtracted signal.

\* \* \* \* \*